United States Patent [19]

Naimer et al.

[11] Patent Number: 5,441,823

[45] Date of Patent: Aug. 15, 1995

[54] PROCESS FOR THE PREPARATION OF GAS DIFFUSION ELECTRODES

[75] Inventors: Neal Naimer; Jonathan R. Goldstein, both of Jerusalem, Israel

[73] Assignee: Electric Fuel (E.F.L.) Ltd., Jerusalem, Israel

[21] Appl. No.: 269,845

[22] Filed: Jul. 1, 1994

[51] Int. Cl.⁶ .................. H01M 4/86; B05D 5/12; C04B 35/00; C25B 11/00

[52] U.S. Cl. ...................... 429/42; 427/115; 264/105; 264/127; 29/623.5; 204/290 R

[58] Field of Search .............. 29/623.5, 623.1; 427/115; 429/42, 27, 40, 212; 264/6, 7, 49, 56, 105, 109, 127, 319; 204/290 R, 294, 284

[56] References Cited

U.S. PATENT DOCUMENTS

| | | | |
|---|---|---|---|
| 3,549,422 | 12/1970 | Wagner | 136/86 |
| 3,854,994 | 12/1974 | Binder et al. | |
| 4,043,933 | 8/1977 | Breault et al. | |
| 4,163,811 | 8/1979 | Kohlmayr et al. | |
| 4,246,324 | 1/1981 | de Nora et al. | 429/17 |
| 4,339,325 | 7/1982 | Solomon et al. | 204/296 |
| 4,341,847 | 7/1982 | Sammells | 429/27 |
| 4,405,544 | 9/1983 | Solomon | 264/127 |
| 4,463,064 | 7/1984 | Ruch et al. | 429/27 |
| 4,565,749 | 1/1986 | van Ommerging et al. | 429/27 |
| 4,585,710 | 4/1986 | McEvoy | 429/27 |
| 4,615,954 | 10/1986 | Solomon et al. | 429/27 |
| 4,696,872 | 9/1987 | Blanchart et al. | 429/42 |
| 4,810,594 | 3/1989 | Bregoli et al. | 429/42 X |
| 4,877,694 | 10/1989 | Solomon et al. | 429/27 |
| 4,906,535 | 3/1990 | Hoge | 429/42 |
| 4,908,281 | 3/1990 | O'Callaghan | 429/27 |
| 4,925,744 | 5/1990 | Niksa et al. | 429/27 |
| 4,927,514 | 5/1990 | Solomon et al. | 429/42 |
| 4,957,826 | 9/1990 | Cheiky | 429/27 |
| 4,975,172 | 12/1990 | Yeager et al. | 429/42 |
| 5,312,701 | 5/1994 | Khasin et al. | 429/42 |

Primary Examiner—Kathryn Gorgos
Assistant Examiner—Bruce F. Bell
Attorney, Agent, or Firm—Helfgott & Karas

[57] ABSTRACT

The invention provides a process for preparing a gas-diffusion electrode for metal-air batteries and fuel cells of the type having a blocking layer formed from a precursor containing carbon black and particulate hydrophobic polymeric binders, comprising heating the carbon black at a temperature of about 400°–1,200° C. for a period of about 1–10 hours in a reducing environment, prior to the formation of the precursor, whereby hydrophilic centers in the pre-treated carbon black are minimized without increasing its corrosivity/surface area and thereby increasing the stability in concentrated KOH at high-cell operating temperatures of a blocking layer formed from the pre-treated carbon black.

13 Claims, 2 Drawing Sheets

PROCESS FOR THE PREPARATION OF GAS DIFFUSION ELECTRODES

The present invention relates to an improved process for preparing a gas diffusion electrode for metal-air batteries and fuel cells.

Metal-air batteries of monopolar and bipolar design, both rechargeable and primary, as well as electrodes therefor, are known in the art as described, e.g., in U.S. Pat. Nos. 3,549,422; 4,246,324; 4,341,847; 4,463,064; 4,565,749; 4,585,710; 4,877,694; 4,908,281; 4,925,744 and 4,957,826.

As is known and described, e.g., in U.S. Pat. No. 4,908,281, metal-air batteries produce electricity by the electrochemical coupling of a reactive metallic anode to an air cathode through a suitable electrolyte in a cell. The air cathode is typically a sheet-like member, having opposite surfaces respectively exposed to the atmosphere and to the aqueous electrolyte of the cell. During cell operation oxygen is reduced within the cathode while metal of the anode is oxidized, providing a usable electric current flow through external circuitry connected between the anode and cathode. The air cathode must be permeable to air but substantially impermeable to aqueous electrolyte, and must incorporate an electrically conductive element to which the external circuitry can be connected. Present-day commercial air cathodes are commonly constituted of carbon (with or without an added oxygen-reduction catalyst) in association with a finely divided hydrophobic polymeric material and incorporating a metal screen as the conductive element. A variety of anode metals have been used or proposed; among them, zinc, iron, lithium, aluminum, or alloys thereof are considered especially advantageous for particular applications, owing to their low cost, light weight, and ability to function as anodes in metal-air batteries using a variety of electrolytes.

A typical aluminum-air cell comprises a body of aqueous electrolyte, a sheet-like air cathode having one surface exposed to the electrolyte and the other surface exposed to air, and an aluminum alloy anode member (e.g., a flat plate) immersed in the electrolyte in facing spaced relation to the first-mentioned cathode surface.

Aqueous electrolytes for aluminum-air batteries consist of two major types, namely a neutral-pH electrolyte usually containing halide salts and, because of relatively low electrical conductivity and the virtual insolubility of aluminum therein, is used for relatively low power applications. The high alkaline electrolyte types usually employ NaOH or KOH solution, and yield a higher cell voltage than the neutral electrolyte versions.

As described also in U.S. Pat. No. 4,906,535 in present-day commercial metal-air cell practice, the air cathode is commonly constituted of carbon (with or without an added dissociation-promoting catalyst) containing a finely divided hydrophobic polymeric material and incorporating a metal screen as the conductive element. Metal-air batteries may be designed to have an extended shelf-storage life rendering them very suitable for standby or emergency uses in that the metal-air battery may be activated by immersing the electrode stack in an electrolyte.

As stated the gas diffusion electrodes are usually comprised of a blocking layer, an active layer and a current collector.

The function of the blocking layer is to face the gas phase and allow penetration of the gas reactants (e.g., $O_2$) and accompanying gas (e.g., $N_2$) while preventing the permeation of electrolyte. It usually comprises hydrophobic elements such as polytetrafluoroethylene (PTFE) in various forms such as films, particles and fibers and carbon black etc.

The active layer must be partially permeable to both the reactant gas (e.g., $O_2$) and liquid (e.g., KOH electrolyte). It further comprises a conducting element such as carbon optionally catalyzed with an electrocatalyst for the gas reaction (e.g., Pt, Ag, the cobalt complex of tetramethoxyphenylporphyrin (CoTMPP) for $O_2$ reduction) or unsupported electrocatalyst (e.g., Ag).

The conducting and/or electroactive component is supported in a matrix with suitable binders, which confer a partially hydrophilic and partially hydrophobic character. The binders may be hydrophilic (e.g., fluorinated polymers such as the perfluorosulfonate ionomer produced by E. I. du Pont de-Nemours under trademark of Nafion) or hydrophobic (e.g., polytetrafluoroethylene PTFE particles, PTFE/carbon mix). There may be an optional removable pore former in the matrix.

The current collector is a metallic support for the active and blocking layer and is placed between them or on either side thereof and allows current removal from the electrode. It usually comprises a woven or expanded mesh or coated mesh which is stable in the electrochemical environment of the electrode (e.g., nickel or silver plated nickel mesh for KOH electrolyte). Alternatively the current collector may be a metallic felt mat (e.g., of nickel) as described in U.S. Pat. No. 5,190,833.

In preparing porous composite electrodes there is a constant search for improved electrodes and methods for the preparation thereof in order to provide an electrode which is more robust for practical application while maintaining high stable performance.

Thus as stated, e.g., in U.S. Pat. No. 4,877,694 porous electrodes containing catalytic particulates have been developed to enhance the commercialization of electrolytic devices such as fuel cells and metal-air batteries. The electrodes can be useful as oxygen cathodes in such batteries and fuel cells. To enhance their commercial potential, efforts have been extended to augment the electrode capability to operate at high current densities while maintaining acceptable durability.

Attention has also been paid to the development of efficient and economical electrodes capable of performing in the harsh chemical environments created by acid or alkaline electrolytes. It has been necessary to attempt to maintain a balance for the permeability of the liquid electrolyte and for the gaseous reactant. Progress in electrode development has led to, for example, electrodes capable of sustained performance at current densities substantially above about 400 milliamps per square centimeter, while exhibiting acceptable resistance to electrolyte. However, long operating life with sustained, desirable performance including resistance to electrode flooding while retarding undesirable depletion of catalytic activity is still needed.

In U.S. Pat. No. 4,405,544 there is described and claimed a method for preparing an electrode active layer comprising mixing an aqueous dispersion of particulate polytetrafluoroethylene with an aqueous suspension of particulate carbon black; washing and drying; mixing with a pore-forming agent; fibrillating said mixture; drying; adding polytetrafluoroethylene fibers while chopping said dried fibrillated mixture and thereafter forming said chopped mixture into a sheet, which is washed and dried.

In a series of patents by Solomon et al. there are described gas diffusion electrodes and methods for the preparation thereof.

Thus e.g., in U.S. Pat. No. 4,339,325 there is described and claimed a porous, coherent, unsintered, uniaxially oriented backing (wetproofing or blocking) layer of fibrillated polytetrafluoroethylene having pore openings ranging from about 0.1 to 40 microns and having an air permeability of about 0.2 ml per minute per centimeter squared per centimeter of water pressure, said layer being from about 5 to 15 mils thick.

As stated in said patent said layer is ready for use as a backing layer in forming an electrode.

In U.S. Pat. No. 4,615,954 there is described and claimed a fast response, high current density oxygen cathode comprising: a form-stable, electrically conductive, wetproofing layer composed essentially of an intimate, consolidated and heat sintered mixture of carbon black and particulate hydrophobic polymeric binder derived predominantly from tetrafluoroethylene, having at least one anisometric electroconductive reinforcing material incorporated therein; and, directly adhered to one surface of said wetproofing layer, a porous active layer having a thickness between about 0.03 and about 0.1 millimeter and composed essentially of a mixture of particles of a polymer of tetrafluoroethylene and cobalt catalyst-containing particles of an active carbon predominantly of a particle size between about 2 and about 20 micrometers and having a B.E.T. surface area of over about 1000 $m^2$/gram.

In U.S. Pat. No. 4,877,694 there is described and claimed an electrode capable of extended performance at high current density, said electrode comprising a porous, gas supplying layer containing hydrophobic polymer, and an electrolyte porous active layer comprising catalyst containing carbon particles intimately blended with, and uniformly distributed throughout, hydrophilic halogenated polymer binder for said catalyzed carbon particles, which intimate blend is combined in said active layer with particulate substance bound with hydrophobic polymer.

Similarly in U.S. Pat. No. 4,927,514 there is described and claimed an electrode in multi-layer form and having enhanced inter-layer bonding, said electrode comprising a gas porous, polymer-containing support layer, a catalyst-containing and polymer-containing active layer and a gas porous intermediate bonding layer consisting of thermoplastic hydrophobic polymer.

All three of the above patents rely on the same type of multi stage process for preparing said electrodes as described e.g., as a seven stage process in, column 2 of U.S. Pat. No. 4,615,954, or in example 1 in U.S. Pat. No. 4,927,514, which process is characterized by forming a hydrophobic support layer which is dried and sintered and then depositing on said dry support layer a further active layer which is also then dried and sintered.

In our now issued U.S. Pat. No. 5,312,701 there is described and claimed a single pass wet fabrication process for preparing a gas diffusion electrode for metal-air batteries and fuel cells comprising:

a) preparing an active-layer forming dispersion containing catalyzed carbon black, hydrophilic fluorinated polymer and particulate hydrophobic fluorinated polymer in a liquid medium;

b) preparing a blocking-layer forming dispersion containing carbon black and particulate hydrophobic polymeric binders in a liquid medium;

c) filtering a first of said layer-forming dispersions though filtering means to deposit a first layer of damp solids mass;

d) filtering a second of said layer-forming dispersions through said first deposited damp solids mass before the drying or sintering of said first deposited damp solids mass in order to deposit a second layer of damp solids mass thereon in such a manner that lower components of said second layer of damp solids mass are intermixed with upper components of said first layer of deposited damp solids mass;

e) drying and compressing said composite first and second layers with a conductive metal mesh incorporated therein; and f) heating said dried layers to a temperature above 270° C. while applying pressure thereto thereby causing the polymeric materials of both layers to sinter and bond with each other and with other components of said layers.

The single pass process of said patent, the teaching of which are incorporated herein by reference has fewer operations and thus is much quicker and more cost effective then the processes described in the prior art. Furthermore, delamination between active and blocking layers during cell life is reduced since there is a more intimate contact between the two layers from the single pass, rather than poorer bonding from the sandwich of two independently dried layers in the two pass method of the prior art. As will be realised the single pass process provides a broader, more overlapping zone between layers, compared with the electrode prepared by the prior art method. This also provides an extended reaction zone and improved electrochemical performance in the cells produced by this process.

In order to improve the blocking layer stability in concentrated KOH at high cell operating temperatures, different treatments of carbon black were evaluated. The aim was to minimize the hydrophilic centers in the black without increasing its corrosivity/surface area, thereby providing a carbon matrix more resistant to failure by flooding.

After further research and development, there has now been found a method of improving the stability of the blocking layer of air electrodes for use in metal-air cells, fuel cells, electrochemical synthesis cells, etc. by employing a heat pretreated carbon black as the precursor of the blocking layer.

More specifically, the present invention now provides a process for preparing a gas-diffusion electrode for metal-air batteries and fuel cells of the type having a blocking layer formed from a precursor containing carbon black and particulate hydrophobic polymeric binders, the improvement comprising heating said carbon black at a temperature of about 400°–1,200° C. for a period of about 1–10 hours in a reducing environment, prior to the formation of said precursor, whereby hydrophilic centers in said pre-treated carbon black are minimized without increasing its corrosivity/surface area and thereby increasing the stability in concentrated KOH at high-cell operating temperatures of a blocking layer formed from said pre-treated carbon black. Suitable reducing environments include hydrogen, ammonia, carbon monoxide, optionally diluted with an inert gas, such as argon or nitrogen.

In preferred embodiments of the present invention said carbon black is heated at a temperature of about 800° C.–1,100° C. Thus, e.g., in an especially preferred embodiment of the present invention treatment of Shawinigan black at 950° C. in a hydrogen environment was found to have the desired effect. The oxides on the surface were reduced without increasing the black surface area. In addition, organic contaminants on the surface are also cracked at the high temperature.

Typically, the pretreated carbon block will be blended with finely-divided dry hydrophobic polymer or with a liquid dispersion of the polymer to form said precursor, and a blocking layer formed from a dispersion containing said pretreated carbon black and particulate hydrophobic polymeric binders in a liquid medium is especially preferred.

As described in the examples hereinafter, the stability of such a black is compared to that of an untreated black by testing the performance of fabricated blocking layers operating as air electrodes in 33% KOH at 80° C. continuously biased to −0.22 V vs. a mercury/mercuric oxide reference electrode. It can be see that there is no change in the hydrophobic properties of the hydrogen treated electrode over a period of 45 days.

As will be realised the conductive metal mesh mentioned hereinbefore can be incorporated in either the blocking layer, the active layer or at the interface of said layers.

In especially preferred embodiments a second mesh made of plastic material, e.g., a mesh made of fluoropolymer or other high temperature plastic, or metallic mesh, having a sintering temperature higher than the temperature used in step f) is incorporated into said composite layers before the sintering thereof.

Furthermore, in especially preferred embodiments at least one of said layer forming dispersions further contains structurally intact fibers precoated with sinterable polymeric material, which material when heat sintered results in said fibers being bonded to each other and to other components of said layer by said sintered polymeric material while maintaining their individual fibrous structure and strength.

As will be realised said precoated fibers can be contained in said active layer forming dispersion, said precoated fibers can be contained in said blocking layer forming dispersion or in both of said layers.

Thus, in contradistinction to the electrodes described in the prior art and available on the market today and the methods for the preparation of the active and blocking layers thereof described in the literature, there is now provided a gas diffusion electrode containing a fiber reinforced composite structure in a layer thereof, said structure comprising structurally intact fibers precoated with sinterable polymeric material, which material is heat sintered, whereby said fibers are bonded to each other and to other components of said structure by said sintered polymeric material, while maintaining their individual fibrous structure and strength.

U.S. Pat. No. 4,906,535 describes a non-woven conductive fibrous web structure (a carbon felt) on which carbon particles are supported with the aid of a non fibrous polymeric substance. This patent specifically notes on column 4, line 37 that the thermal processing steps are well below the sintering temperature of the polymeric substance, whereas the electrodes of the present invention preferably comprise a particulate microstructure which is reinforced by coated fibers and in which the bonding of the complete structure is due to the sintering of both polymeric particles in the microstructure and in the coating of the fiber.

The optimization of the microstructure of the active layer in the electrodes of the present invention contribute to the achievement of high performance of the gas diffusion electrode. The microstructure obtained in U.S. Pat. No. 4,906,535 is basically dominated by the carbon felt skeleton to which other components are added on, and this is very limiting as to optimization. Moreover, the strength of the microstructure is poor in U.S. Pat. No. 4,906,535 because the polymeric binder is not sintered.

In U.S. Pat. No. 4,405,544 mentioned hereinbefore the powdered components are roll-pressed into a sheet at a rolling temperature of about 37° to 49° C. and the highest temperature used in the preparation thereof was 204° C. for the entirely different purpose of decomposing chloroplatinic acid to platinum which temperature is insufficient to effect sintering.

In U.S. Pat. No. 4,887,694 mentioned hereinbefore sintering is indeed carried out at a temperature of between 250° C. and 350° C., however, the mixture described therein does not contain reinforcing fibers and the tensile strength of a non-fiber reinforced layer is substantially lower than that of one prepared according to the present invention.

Furthermore, U.S. Pat. No. 4,615,954 teaches the sintering of a mixture containing both fibers and PTFE particles, however the tensile strength of a composition prepared from a mere mixture of fibers and PTFE particles also does not have this tensile strength achieved by providing structurally intact fibers precoated with sinterable polymeric material, which material is then heat sintered so that the precoated fibers are bonded to each other and to other components of the formed layer.

In preferred embodiments of the present invention said intact fibers are carbon fibers coated with a fluoropolymer.

In other preferred embodiments of the present invention said intact fibers are fluoropolymer fibers coated with a different fluoropolymeric material, said material having a lower sintering temperature than said fibers.

According to the present invention the skeleton of the electrode is formed by the arrangement of the particulate microstructure which can be independently optimized. To this, a reinforcing fibrous element is added and sintered, which on the one hand does not detract from the microstructure and performance, yet on the other hand substantially improves strength.

In preferred embodiments of the present invention said fibers have a length of between about 100 and 5000 microns and a diameter of between about 5 and 100 microns. The fibers will preferably constitute 0.5–50 wt % of the layer and the thickness of the coating of said fibers will preferably be between 0.1 micron and 10 microns, wherein said coating thickness will usually not exceed one tenth of the thickness of the fiber.

The term "gas diffusion electrode" as used herein relates not only to the air or oxygen cathodes as find application in metal-air batteries, such as aluminum-air and zinc-air batteries, but also relates to such electrodes as may find use in applications such as for electrochemical synthesis cells such as the chlor-alkali cell described in U.S. Pat. No. 4,405,544, related fuel cell applications, metal-gas cells and metal hydroxide-hydrogen cells (e.g. nickel-hydrogen and silver-hydrogen cells). It is therefore meant to be understood that the electrode of the present invention need not be limited to use as an air cathode, i.e., limited to use for oxygen reduction, but can be employed in a variety of reactions including hydrogen oxidation, sulphur dioxide oxidation, organic fuel oxidation, hydrogen evolution and oxygen evolution.

Moreover, a variety of electrolytes may come into contact with the gas diffusion electrode of the present invention, as represented by acid electrolytes, alkaline electrolytes and saline electrolytes. The electrolytes may be non-aqueous systems, and therefore the electrode may find use in applications such as organic electrolyte batteries. Where the electrode of the present invention may be made up from two layers, there will be used terms herein to describe the one, or hydrophobic layer, such as the "wetproofing layer" or "backing layer" or "gas supplying layer". This layer can be made of "hydrophobic ingredient" or "gas supplying material". Then the other, or partially hydrophilic layer, may often be referred to herein as the "active layer" and the material used in preparing it as the "active material" or "hydrophilic ingredient". Such active material can consist of a mixture of finely-divided catalyzed carbon plus hydrophilic binder, and/or hydrophobic binder.

During the processing of the electrode, thermal steps exceed the sintering temperature of the coating of the fiber but not that of the core material of the fiber. The fibers thus become bonded to the other components and to each other while maintaining fibrous structure and maintaining their original strength.

In a first preferred embodiment of the present invention said intact fibers could be carbon fibers coated with a fluoropolymer, while in another preferred embodiment of the present invention said intact fibers could be fluoropolymer fibers coated with a different fluoropolymer having a lower sintering temperature (e.g., PTFE having a sintering temperature of 355° C. coated with FEP fluorethylene copolymer having a sintering temperature of about 270° C.)

It has now been surprisingly found that electrodes produced according to the present invention are superior to electrodes having no fibers because of the inherent added mechanical strength provided by the fiber reinforced composite structures. They are also superior to electrodes with monocomponent fibers where the processing is either below or above the fiber sintering temperature. In the case where the processing temperature is below the sintering temperature of the fiber (e.g. carbon fibers, where processing is at 355° C.) the fibers do not themselves sinter and their adhesion to the structure is poor. In the case where the processing temperature is above the sintering temperature of the fiber (e.g. PTFE fibers where processing is at 355° C.), the fibers undergo massive melting and lose their structural integrity, and this has a detrimental effect on the electrode microstructure.

As will be demonstrated hereinafter the present invention provides stable high power electrode performance with improved mechanical strength compared with prior art electrodes. As will be realised, improved mechanical strength is a vital requirement for metal-air batteries (e.g. for electric vehicle applications with mechanically rechargeable anodes, in which mechanical wear and tear requirements are especially severe), or generally in metal-air, electro-synthesis cells or fuel cell systems due to the fact that the gas electrode forms an external exposed wall of the cell and must not leak electrolyte.

For the hydrophobic fluorinated polymer used in the blocking layer forming dispersion particularly useful are polytetrafluoroethylene (PTFE) and fluorinated ethylene-propylene copolymer (FEP). Other useful halocarbons include polychlorofluoroethylene. Mixtures of these resins are also servicable.

Typically, the particulate carbon after undergoing the heating pre-treatment of the present invention will be blended with a liquid dispersion of finely-divided dry hydrophobic polymer, or with the polymer in dry powder form. In the case of carbon mixed with a liquid dispension of hydrophobic polymer, subsequent heating is employed to prepare a dry blend, as well as to remove wetting agents that can be incorporated in the dispersions. Most always for such a blend the polymer will contribute from about 20 to about 60 weight percent of the blend, on a solids basis of polymer plus particulate. Less than about 20 weight percent can provide insufficient polymer for desirably binding all carbon particles, while greater than about 60 weight percent of polymer can lead to low gas porosity for the backing layer.

After mixing, the blend can then be heat treated to melt and diffuse the polymer. For example, using PTFE, heating at a temperature of about 250°–350° C. and for a time approximately 1 to 4 hours will usually be sufficient. Upon cooling, the resulting heat treated blend can be comminuted, such as by milling, to form finely-divided particles of the particulate carbon bound with hydrophobic polymer, with all such finely-divided particles usually being within the size range of from about one micron to about 50 microns.

When the support layer suspension is prepared from this resulting particulate blend, the blend is then dispersed in a liquid medium. Such a medium will usually be a low boiling organic liquid medium, such as isopropyl alcohol or a blend of alcohols. The particles can be vigorously mixed into the medium by any suitable means for blending a solid particulate into a liquid to form a uniform dispersion.

For the active layer, there will be used a particulate hydrophobic fluorinated polymer in combination with a hydrophitic fluorinated polymer.

Particularly useful fluoropolymers such as PTFE and FEP, as well as other halocarbon polymers such as polychlorofluoroethylene, or a mixture of these resins can be used. The polymer can be utilized as a very finely divided particulate solid, e.g., of micro-sized particles. Such particles can then be dispersed in a liquid medium, e.g., an aqueous or an organic liquid medium such as an alcohol medium, or dispersed in a mixture of these liquids. Alternatively, a previously prepared polymer dispersion may be used, for example a commercially available dispersion containing sub-micron sized PTFE particles.

The catalyzed carbon black particles plus the polymer can then be blended together, usually in an aqueous medium by any means for intimately blending together very finely divided solids in a liquid, e.g., ultrasonic agitation or high speed stirring. It is, however, to be understood that mixing together of dry ingredients is also contemplated, and thus, dry blending would be utilized. For any means for bringing the active ingredient and polymer together, the polymer will contribute only a minor weight amount, usually from about 0.1 to 10 weight percent of the blend, on a solids basis of polymer plus active ingredient. Less then about 0.1 weight percent can provide insufficient polymer for desirably binding all of the active ingredient particles into an adherent active layer. On the other hand, greater than about 10 weight percent of polymer can lead to an active layer of retarded activity. Preferably, for best activity plus economy, there will be present in the active layer from about 4 to 6 weight percent of polymer, basis polymer plus active ingredient.

As indicated in contradistinction to the processes described in the prior art the first deposited layer is neither dried nor sintered and the second layer is applied thereto while said first layer is still in the form of a damp solids mass whereby lower components of said second layer intermix with upper components of said first layer during the filtering of said second layer forming dispersion therethrough.

Thereafter said composite first and second layers are dried and compressed, preferably at a temperature of about 80°–150° C. and a pressure of about 150–350 kg/cm$^2$.

After said drying and compression the sintering of the composite first and second layers is preferably carried out at a pressure of about 5–40 kg/cm$^2$ and a temperature of about 270°–355° C. for a period of 3–30 minutes.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion 0f the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

EXAMPLE 1

1 kg of Shawinigan black (Chevron Chemical Company) was loaded into an inert environment oven. A hydrogen/nitrogen gas mix (5% hydrogen in nitrogen) was introduced into the oven. The exiting gas was bubbled through water. The temperature of the oven was raised at a rate of 250° C./hr to 950° C. and maintained at this temperature for 3 hours. The heating was then switched off and the oven was allowed to cool to room temperature by natural convection while maintaining the gas flow.

EXAMPLE 2

A hydrophobic membrane was fabricated from the hydrogen-treated material in the following manner (Sample N1):

62 gm of the hydrogen treated Shawinigan black was dispersed in distilled water (3.2 liter) by means of an overhead stirrer. To this 38 gm of particulate ethylene propylene co-polymer dispersion (FEP-T120 dispersion, Du Pont) was added, and the mixture further blended by the stirrer. The resultant dispersion was filtered on a Buchner funnel and the moist solid was then dried overnight in an oven at 150° C. The dried solid was then heat treated at 250° C. for 24 hours in order to remove the wetting agent of the FEP dispersion. The resultant FEP/carbon mixture was then chopped using a coffee grinder (SEB, type 8115) for two minutes.

A 0.8 gm portion of the above FEP/carbon mixture was added to isopropanol (30 ml) and homogenized for 1 minute in a Moulinex blender (type 276) in order to get a suspension for 40 cm$^2$ hydrophobic membrane area.

A woven nickel mesh current collector (40 mesh) was placed on a filter paper through which the suspension was filtered until it had a mud-like appearance. The layer was then dried at 120° C. while being compressed at 200 kg/cm$^2$. It was then sintered in-situ by lowering the pressure to 20 kg/cm$^2$ and raising the temperature to 305° C. for 20 minutes.

COMPARATIVE EXAMPLE 3

For comparison purposes another hydrophobic membrane (Sample N2) was fabricated in the same manner described in Example 2 but the Shawiningan black employed was not pretreated.

EXAMPLE 4

Figure 1:
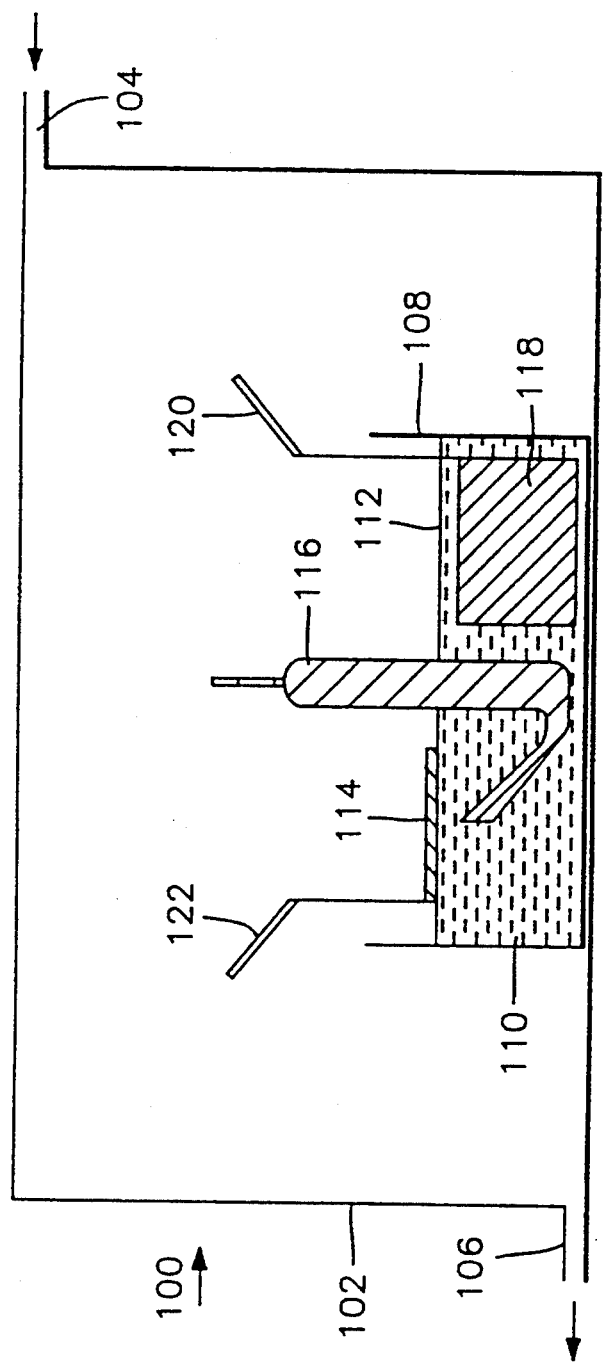
FIG. 1 is a cross-sectional front view of an electrochemical test-cell for air electrode current-voltage polarization measurements.

An electrochemical test cell 100, as illustrated in FIG. 1, was prepared to evaluate the current-voltage polarization characteristics of a hydrophobic membrane.

Inside a sealed container 102 having an air inlet 104 and an air outlet 106, there was placed a vessel 108 into which was introduced as electrolyte 110 a 7 molar potassium hydroxide solution at 80° C. On the surface 112 of said electrolyte, there was placed for testing first a hydrophobic membrane 114 of active area 6.6 cm$^2$ cut from a 40 cm$^2$ piece and fitted with a nickel tab 122 for current take-off, prepared by the method of Example 2, followed by a similar piece prepared by the method of Example 3 to test for activity for oxygen reduction in the electrochemical half-cell.

A mercury/mercuric oxide reference electrode 116 with Luggin capillary was introduced into the electrolyte to show the potential of the air cathode alone without a battery-type anode. A large area nickel counter electrode 118 was also introduced into the electrolyte to complete the electrical circuit, nickel leads 120, 122 being attached to said counter electrode 118 and said air electrode 114 respectively, for connection to a power supply (not shown).

Figure 2:
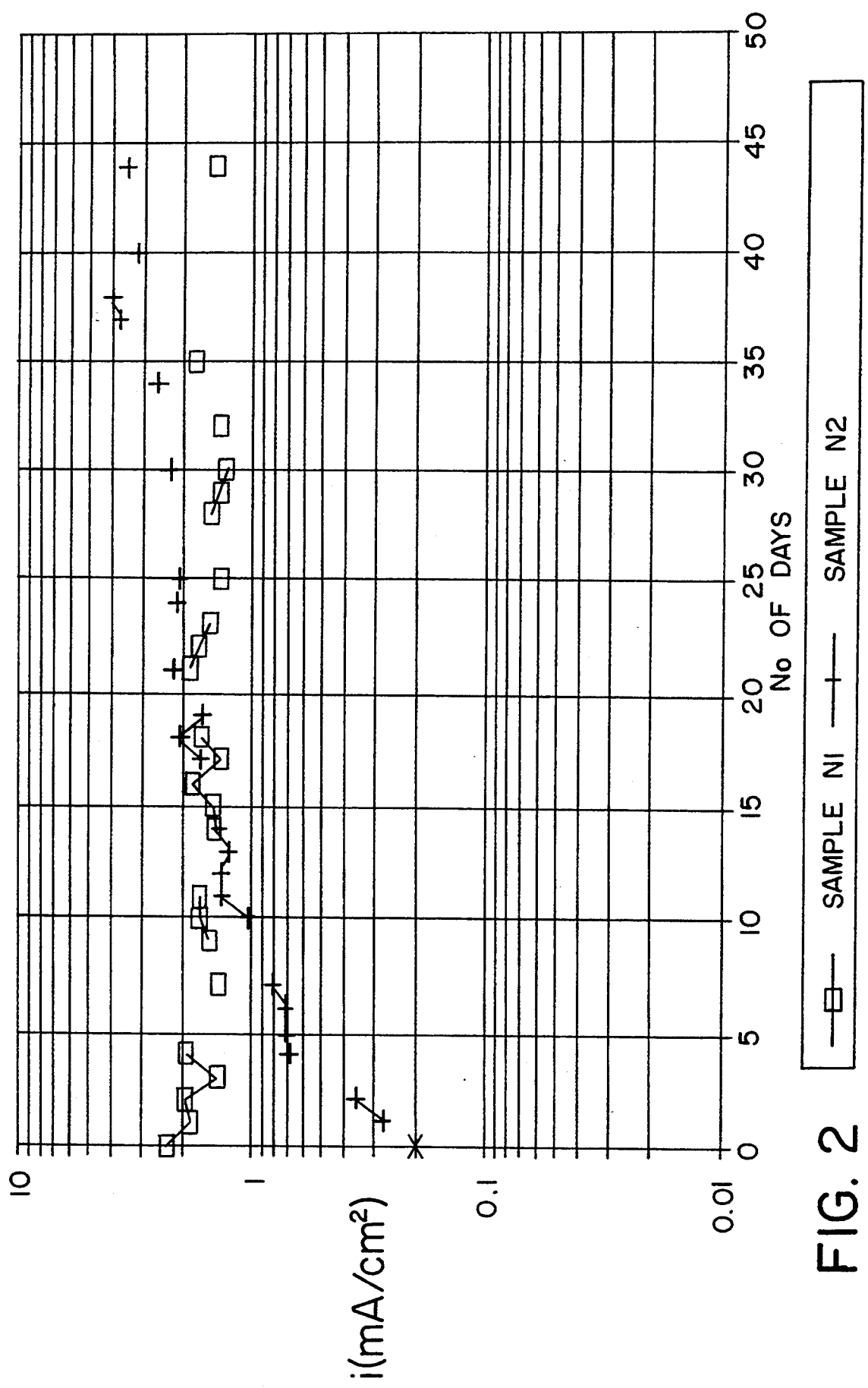
FIG. 2 is a current-voltage polarization graph plotting current density at the air electrode vs. the air electrode potential.

The feed gas was air while the electrolyte temperature was kept at 80° C. The polarization was maintained at −220 mV vs. the mercury/mercuric oxide reference electrode and the current (activity for oxygen reduction) was measured as a function of time. The results for sample N1 and sample N2 are presented in FIG. 2. It can be observed that for sample N1 the current starts at about 2 mA and remains stable over the 45 day test. This indicates that the original hydrophobic properties of the electrode are maintained. The results for non-treated sample N2 are also presented in FIG. 2. It can be seen that the current starts very low (0.2 mA) but continuously rises (beyond the level of N1) indicating that the hydrophobic properties are slowly deteriorating with time.

EXAMPLE 5

A coated fiber-reinforced blocking layer precursor for a gas diffusion electrode which can be used in a metal-air battery, in a hydrogen-oxygen fuel cell, in an electrosynthesis cell or for similar uses was made as follows:

62 gm of acetylene carbon black (Shawinigan Black, Chevron), pretreated as described in Example 1, was dispersed in distilled water (3.2 liter) by means of an overhead stirrer. To this, 38 gm of particulate ethylene propylene co-polymer dispersion (FEP-T120 dispersion, DuPont) was added, and the mixture further blended by the stirrer. The resulting dispersion was filtered on a Buchner funnel and the moist solid was then dried overnight in an oven at 150° C. The dried solid was then heat treated at 250° C. for 24 hours in order to remove the wetting agent of the FEP dispersion. The resulting FEP/carbon mixture was then chopped using a coffee grinder (SEB, type 8115) for two minutes.

A 0.8 gm portion of the above FEP/carbon mixture was then mechanically blended with 0.2 gm of FEP coated PTFE fibers (W.L. Gore and Assocs. Inc) in a Pascall Lab Mixer, followed by chopping in the coffee grinder. The chopped mixture was added to isopropanol (30 ml) and homogenized in a blender (Moulinex, type 276). The homogenized mixture was then filtered to form a 40 cm$^2$ mud-like layer.

b) 800 ml of isopropanol was stirred together with 300 ml of hydrophilic fluorinated polymer solution (Nafion 1100 EW, Solution Technology Inc.). A 50 gm portion of Shawinigan black catalyzed by 10 wt % CoTMPP electrocatalyst (Aldrich) was thoroughly dispersed in the above solution using an overhead mixer. This mixture was then dried at 55° C. overnight. The dried catalyzed mixture was then chopped as described above.

An 0.5 gm portion of the chopped catalyzed product was then mechanically blended with 0.08 gm FEP powder (DuPont, Teflon P 532-8000) and 0.06 gm of FEP-coated PTFE fibers (Gore) in the Pascall Lab Mixer followed by chopping in the coffee grinder. The resulting chopped active layer mixture was added to isopropanol and homogenized in the Moulinex blender. The homogenized mixture was then filtered through the blocking layer to form a composite 40 cm$^2$ mud-like layer onto which a nickel mesh current collector (40 mesh size) was placed. The resulting matrix was dried at about 120° C. while being compressed at 200 kg/cm$^2$. The dried matrix was then sintered at 305° C. for 30 minutes under a pressure of 15 kg/cm$^2$. This dried matrix could then be used as an oxygen reduction cathode.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a process for preparing a gas-diffusion electrode for metal-air batteries and fuel cells of the type having a blocking layer formed from a precursor containing carbon black and particulate hydrophobic polymeric binders, the improvement comprising heating said carbon black at a temperature of about 400°–1,200° C. for a period of about 1–10 hours in a reducing environment, prior to the formation of said precursor, whereby hydrophilic centers in said pre-treated carbon black are minimized without increasing its corrosivity/surface area and thereby increasing the stability in concentrated KOH at high-cell operating temperatures of a blocking layer formed from said pre-treated carbon black.

2. A process for preparing a gas-diffusion electrode as claimed in claim 1, wherein said carbon black is heated at a temperature of about 800°–1,100° C.

3. A single pass wet fabrication process for preparing a gas diffusion electrode for metal-air batteries and fuel cells comprising:
   a) preparing an active-layer forming dispersion containing catalyzed carbon black, hydrophilic fluorinated polymer and particulate hydrophobic fluorinated polymer in a liquid medium;
   b) preparing a blocking-layer forming dispersion containing carbon black and particulate hydrophobic polymeric binders in a liquid medium, wherein said carbon black is heated at a temperature of about 400°–1,200° C. for a period of about 1–10 hours in a reducing environment, prior to the formation of said dispersion;
   c) filtering a first of said layer forming dispersions though filtering means to deposit a first layer of damp solids mass;
   d) filtering a second of said layer forming dispersions through said first deposited damp solids mass before the drying or sintering of said first deposited damp solids mass in order to deposit a second layer of damp solids mass thereon in such a manner that lower components of said second layer of damp solids mass are intermixed with upper components of said first layer of deposited damp solids mass;
   e) drying and compressing said composite first and second layers with a conductive metal mesh incorporated therein; and
   f) heating said dried layers to a temperature above the sintering temperature of the hydrophobic polymer while applying pressure thereto thereby causing the polymeric materials of both layers to sinter and bond with each other and with other components of said layers.

4. A single pass wet fabrication process for preparing a gas diffusion electrode for metal-air batteries and fuel cells as claimed in claim 3 comprising:
   a) filtering an active-layer forming dispersion containing catalyzed carbon black, hydrophilic fluorinated polymer and a particulate hydrophobic fluorinated polymer, in a liquid medium through a metal mesh to deposit a first layer of damp-solids mass thereon;
   b) filtering a blocking-layer forming dispersion containing said pretreated carbon black and particulate hydrophobic polymeric binders in a liquid medium through said active layer before the drying, pressing or sintering thereof to deposit a second layer of damp-solids mass thereon and intermixed with upper components thereof;
   c) drying and compressing said composite first and second layers; and
   d) heating said dried layers to a temperature above 270° C. while applying pressure thereto, thereby causing the polymeric materials of both layers to sinter and bond with each other and with other components of said layers.

5. A single pass wet fabrication process for preparing a gas diffusion electrode, as claimed in claim 3, wherein a second mesh made of plastic or metal having a sintering temperature higher than the temperature used in step f) is incorporated into said composite layers before the sintering thereof.

6. A single pass wet fabrication process for preparing a gas diffusion electrode, as claimed in claim 3, wherein said drying and compression is carried out at a temperature of about 80°–150° C. and a pressure of about 150–350 kg/cm$^2$.

7. A single pass wet fabrication process for preparing a gas diffusion electrode, as claimed in claim 6, wherein said precoated fibers are contained in said active layer forming dispersion.

8. A single pass wet fabrication process for preparing a gas diffusion electrode, as claimed in claim 6, wherein said precoated fibers are contained in said blocking layer forming dispersion.

9. A single pass wet fabrication process for preparing a gas diffusion electrode, as claimed in claim 6, wherein said fibers have a length of between about 100 and 5000 microns and a diameter of between about 5 and 500 microns.

10. A single pass wet fabrication process for preparing a gas diffusion electrode, as claimed in claim 6, wherein said intact fibers are carbon fibers coated with a fluoropolymer.

11. A single pass wet fabrication process for preparing a gas diffusion electrode, as claimed in claim 6, wherein said intact fibers are fluoropolymer fibers coated with a different fluoropolymeric material, said material having a lower sintering temperature than said fibers.

12. A single pass wet fabrication process for preparing a gas diffusion electrode, as claimed in claim 3, wherein said sintering is carried out at a pressure of about 5–25 kg/cm$^2$ and a temperature of about 270–355° C. for a period of 3–30 minutes.

13. A single pass wet fabrication process for preparing a gas diffusion electrode, as claimed in claim 3, wherein at least one of said layer forming dispersions further contains structurally intact fibers precoated with sinterable polymeric material, which material when heat sintered results in said fibers being bonded to each other and to other components of said layer by said sintered polymeric material while maintaining their individual fibrous structure and strength.

* * * * *